INVENTOR
ROBERT S. DAVIS
BY
ATTORNEY

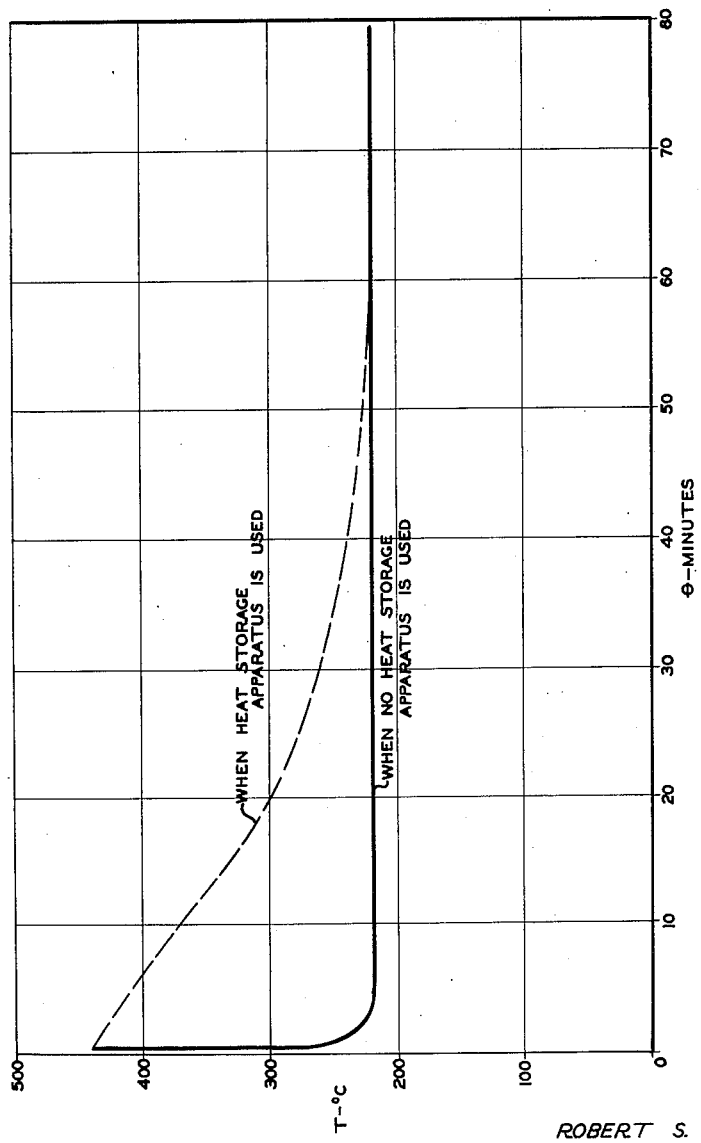
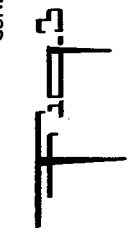

United States Patent Office 3,037,346
Patented June 5, 1962

3,037,346
HEAT STORAGE IN CHEMICAL PROCESSES
Robert S. Davis, New Rochelle, N.Y., assignor to Scientific Design Company, Inc., New York, N.Y., a corporation of Delaware
Filed May 29, 1958, Ser. No. 738,823
10 Claims. (Cl. 60—39.02)

This invention relates to apparatus for heat storage in chemical processes. More particularly, this invention relates to the use of a vessel containing a bed of packed solids having suitable characteristics for heat storage in chemical processes subject to unsteady state flow and temperature conditions. Specifically, this invention relates to contacting gases with an apparatus containing heat storage solids and means for passing the contacted gases from such apparatus to apparatus sensitive to thermal shock.

It is widely known in the art that materials of high heat capacity can be used to absorb large quantities of heat and subsequently reject this heat over a given period of time. The rate at which heat is absorbed and rejected is difficult to control inasmuch as these rates are a function of many physical variables and characteristics, making the design of such apparatus a difficult and complex problem. In a wide variety of chemical processes unsteady state flow and temperature conditions create great variations in the heat flow and temperature conditions of streams contacting various parts of the process system. Since the design of such apparatus is often based on limited allowable thermal stresses, sudden increases or decreases in temperature of gases flowing into or out of such apparatus can create thermal shock which can cause significant damage to the equipment. Because of this danger, expensive methods of controlling temperature variation in chemical processes are required, thereby resulting in increased equipment costs.

It is a feature of this invention to produce a design of an apparatus for heat storage for which the rate of heat transfer can be controlled.

Another feature of this invention is the provision of an inexpensive and efficient method of controlling temperature variations in a chemical process without the need for expensive equipment with complex control and high maintenance costs.

A further feature of the invention is an economical method for protecting gas turbines from thermal shock by use of a heat storage apparatus as an inexpensive temperature control.

Still another feature of the invention is the minimizing of the outlet temperature fluctuation of gases passing out of a catalytic combustion vessel or reactor and flowing to another piece of equipment sensitive to thermal shock.

In a preferred embodiment of the invention the heat storage apparatus comprises a vessel containing a bed of packed solids, preferably spheres, of a metallic material such as iron or steel, the solids having a heat capacity in the range of from about .1 to .3 B.t.u./lb./°F., a maximum diameter less than about 10 inches and being disposed as to allow gas flow through the vessel in the range of from about 100 to 20,000 pounds per hour per square foot (lb./hr./ft.$^2$) of total empty cross-sectional area, the ratio of the diameters of the spheres to the vessel diameter being less than about .1.

Another preferred embodiment of the invention comprises in combination a gas turbine, the heat storage apparatus heretofore described, and conduit means for passing the gases having contacted the bed of solid spheres, into the turbine.

Still another preferred embodiment of the invention comprises a vessel having a gas inlet means to a catalytic oxidation zone, a heat storage zone comprising the bed of solid spheres heretofore described, the heat storage zone having means to receive the hot oxidation gases from the catalytic oxidation zone, a means for supporting the catalytic oxidation zone, a gas outlet means from the heat storage zone and means for allowing inlet gases to the vessel bypassing the catalytic oxidation zone.

Another preferred embodiment of the invention comprises in combination a gas turbine; a vessel having a gas inlet means to a catalytic oxidation zone, a heat storage zone comprising the bed of solid spheres heretofore described, the heat storage zone having means to receive the hot oxidation gases from the catalytic oxidation zone, means for supporting the catalytic oxidation zone, a gas outlet means from the heat storage zone, means for allowing inlet gases to the vessel to bypass the catalytic oxidation zone; and conduit means for passing the hot oxidation gases into the turbine.

Another feature of the invention is a process for minimizing temperature variations of inlet gases to a turbine, comprising contacting the heat storage apparatus heretofore described with the gases and passing the gases into a gas turbine.

Another feature of the invention is a process for minimizing the temperature variations of inlet gases to a turbine wherein said gases contain catalytically combustible materials comprising catalytically oxidizing the gases and passing the hot oxidation gases through the heat storage apparatus heretofore described prior to passing the oxidation gases through the turbine.

Other features of the invention will become apparent from the description thereof which follows:

FIGURE 3 is a plot of the outlet gas temperature as a function of time for a system utilizing the heat storage apparatus.

Figure 1:
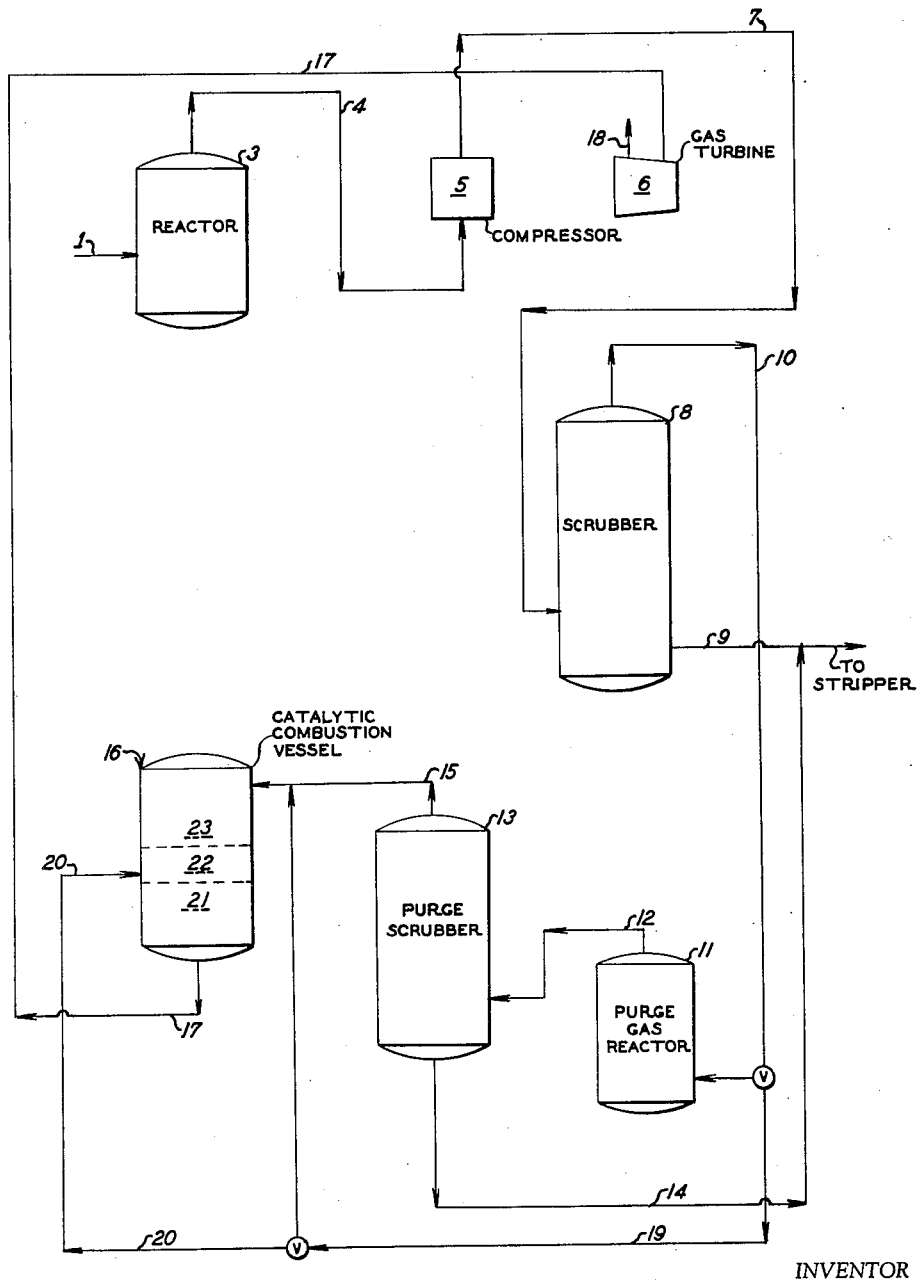
FIGURE 1 is a schematic illustration of a system embodying the present invention.

Referring to FIGURE 1 of the drawing, a gaseous mixture containing combustible material is passed through conduit 1 into reactor 3 where the mixture is catalytically oxidized. The reaction vapors are passed through line 4 into compressor 5 where they are compressed and led through line 7 into scrubber 8. The mixture is scrubbed and the bottoms containing the bulk of the desired product are led through line 9 to a stripping column. The overhead from the scrubber containing the purge gases is led through line 10 into purge gas reactor 11. A bypass valve is supplied in line 10 to permit bypassing of the vapors directly into catalytic combustion vessel 16 through line 19. The vapors passing through line 10 into purge gas reactor 11 containing residual combustible materials are catalytically oxidized and the products of combustion passed through line 12 into purge scrubber 13. The bottoms from this scrubber containing the desired product are led through line 14 and merged with the products in line 9 to the stripping column. The overhead from the purge gas scrubber is passed into line 15 and fed into catalytic combustion vessel 16 which contains packed solids comprising the heat storage apparatus. The gases passing through the catalytic oxidation step are contacted with the packed solids and are passed through line 17 into gas turbine 6 where they are expanded to supply the power means for driving the compressor 5. The expanded gases are passed to the atmosphere through line 18.

If it is desired to bypass the catalytic oxidation step, the gases passing through line 19 may enter the lower portion of vessel 16 containing the packed solids by entering through line 20. These gases after being contacted with the heat storage solids are led through line 17 into the gas turbine.

In the foregoing embodiment, the heat storage apparatus minimizes sudden temperature fluctuations of gases entering the turbine. If it is assumed that for some reason it is necessary to bypass the catalytic oxidation step and the gases were not contacted with the heat storage apparatus, the temperature of the gases entering the turbine would instantaneously fall. For example, in a characteristic ethylene oxide purge gas system if the inlet gas temperature to the turbine of the products of combustion of the purge gases exiting from the catalytic combustion step was 480° C., bypassing the catalytic oxidation step and allowing the purge gases to directly enter the turbine without contacting the heat storage apparatus would instantaneously reduce the inlet gas temperature to the turbine from 480° C. to 220° C. If the gases bypass the catalytic oxidation step but are passed through the heat storage solids prior to entry into the gas turbine, the instantaneous temperature drop could be minimized in one design of the heat storage apparatus such that the temperature of the gases leaving the heat storage solids would drop instantaneously from 480° C. to approximately 430° C. Another 50° drop in outlet gas temperature would occur over a period of 10 minutes. Hence, when the inlet gas temperature to the heat storage solids is instantaneously dropped from 480° C. to 220° C., the outlet gas temperature from the solids would only drop from 480° C. to 380° C. over a period of 10 minutes and it would take about one hour to reach 220° C. This gradual rate of cooling would provide for adequate protection against sudden temperature fluctuations or thermal shock to the gas turbine. In plant operation, bypassing the catalytic oxidation step would be required, for example, if there was a sudden increase in the heat value of the purge gases. Such sudden increases probably would result from allowing the purge gases to bypass the purge reactor and directly contact the catalyst in the catalytic combustion vessel thereby causing certain temperature changes in the catalyst which might be harmful. Therefore, by providing the heat storage apparatus, bypassing of the catalyst could be effected (thereby preventing the possibility of catalyst poisoning), inasmuch as the resulting temperature drop of the inlet gas to the turbine would be substantially reduced eliminating the danger of thermal shock to the turbine. This would enable a plant operator to evaluate the situation which caused the sudden increase in the heat value of the purge gas and permit him to take the necessary action to restore normal steady state operating conditions. Similarly, if the temperature of the gases leaving the catalyst bed are, by reason of higher fuel or oxygen level, increased, allowing these gases to contact the heat storage solids would minimize the sudden increase in the inlet gas temperature to the gas turbine such that thermal shock to the gas turbine would be avoided.

Although the use of purge gases from an ethylene oxide reaction system is described in the foregoing paragraph, it is intended in the present invention that any gas or mixture of gases subjected to sudden temperature fluctuations prior to entry into a gas turbine be contacted with the heat storage apparatus described herein, when such turbines can be damaged by thermal shock or when it is desired to keep a compressor running while taking steps to correct the upset condition with its attendant possibilities of equipment damage.

For example, utilization of the present invention may be made to control the temperature fluctuation of steam evolved from boilers which are subject to changes in load. Such application permits operation of the gas turbine as the result of steam generation and is useful particularly in plant start-up when the catalytic combustion vessel or reactor is not in use. By switching the means driving the turbine from gas expansion from the reactors to steam generated from the boilers the air compressors may be maintained regardless of reactor operation. Employing the heat storage apparatus to protect the turbine permits use of the boilers to drive the turbine since the thermal shock or load changes to the turbine resulting from boiler load fluctuation may be reduced.

The present invention may also be used in combination with fired gas heaters. The catalytic combustion vessel may be charged with gases coming from the fired gas heaters. Flame failure in these heaters often results in sudden decreases in exit gas temperatures. These gases of variable temperature enter the catalytic combustion chamber and employing the heat storage means at the exit of the chamber allows enough time to correct the failure without requiring shutting down of the turbine.

Figure 2:
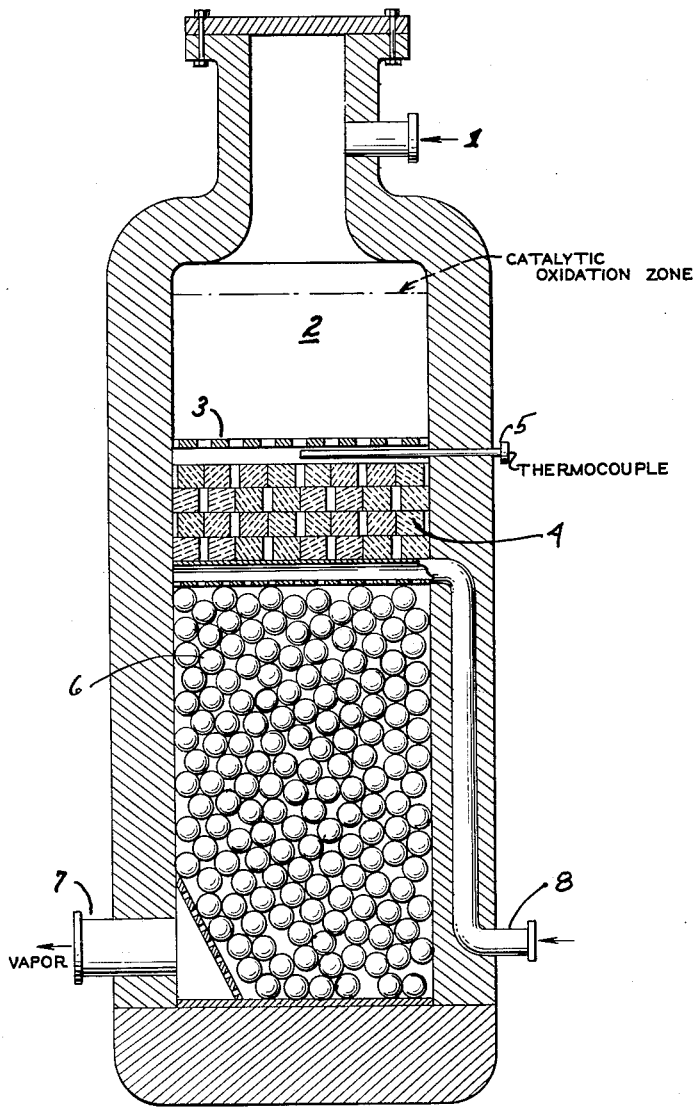
FIGURE 2 is a schematic illustration of an apparatus embodying the present invention.

In FIGURE 2 of the drawing gases containing combustible materials enter through inlet 1 and pass down through the catalytic oxidation zone 2 containing a catalyst bed supported by grating 3. The gases are oxidized and pass through the open refractory brick 4. A thermocouple is inserted at 5 to determine the temperature of the products of combustion. These gases pass through the open refractory brick 4 which prevents back mixing of the gases and radiation losses, and contact the heat storage solids 6 comprising 3 inch chromium steel balls. The gases pass out of the vessel through outlet 7.

Inlet means 8 is provided to allow inlet gases to bypass the catalytic oxidation zone 2 and directly pass into the heat storage zone 6.

Although the heat storage solids are illustratively contained in the catalytic oxidation vessel, it will be readily apparent to one skilled in the art that the solids may be confined in a separate vessel or, in a wide variety of processes, the solids may be combined with or contained in any of several types of equipment for which the control of temperature fluctuations is desirable.

In view of the foregoing disclosure, variations and modifications thereof will be apparent to one skilled in the art and it is intended to include within the invention all such variations and modifications except as do not come within the scope of the appended claims.

*Example 1*

A cylindrical vessel 6.6 feet in diameter and 4 feet in length is packed with approximately 5,200 pounds of steel balls having diameters of about 5 inches. Approximately 81,400 pounds per hour of a gas heated to 480° C., containing carbon dioxide, ethylene oxide and mainly nitrogen are passed through the vessel such that the temperature of the outlet gases is maintained at about 480° C. The temperature of the gases entering the vessel is then reduced instantaneously to 220° C. A plot of the outlet gas temperature from the vessel as a function of time is recorded from the time of the instantaneous drop in the inlet gas temperature, as shown in FIGURE 3.

When the instantaneous inlet temperature to the vessel drops from 480° C. to 220° C., the instantaneous outlet gas temperature is observed to be 430° C. and 10 minutes later is observed to be 380° C., as is shown on curve A which plots outlet gas temperature as a function of time when the heat storage apparatus is employed with the vessel. Curve B is drawn for comparative purposes to show the virtually straight-line instantaneous curve obtained when the heat storage apparatus is not used with the vessel.

In addition to iron, steel, or metal solids, other materials such as alloys, ceramics, stone, pumice or any other solid with adequate heat capacity which is readily available and resistant to corrosion may be employed for heat storage.

Application of the present invention is suggested for catalytic oxidation reactions in which a catalyst of low heat capacity is used, such as in the oxidation of hydrocarbons to methanol.

Other applications wherein variable, unsteady state processes are encountered, will be readily apparent to one skilled in the art. The invention may, of course, be utilized with steam turbines in a similar manner to the embodiments heretofore described in conjunction with gas turbines.

The diameter of the solids employed for heat storage should be less than 10 inches since utilization of larger diameters will yield limited heat transfer rates, thereby changing the response of the system.

Diameters in the range of from about 2 inches to 10 inches are desirable. Preferably, the diameters should be in the range of from about 3 inches to 5 inches.

Diameters less than 1 inch are not desirable since high pressure drops through the apparatus will be encountered. However, if used in small scale equipment such as in laboratory applications, diameters less than 1 inch may be economically utilized.

The solids preferably are spherical in shape for ease of handling and to minimize pressure drop through the apparatus. However, any irregular shaped or other solid form may be effectively employed.

It is intended in the present invention that the vessel geometry not be limited to the specifications described in Example 1. The selection and sizes of materials, vessel diameter, and gas composition will be dependent upon the process, the temperature variations of the gases in the system, and the allowable thermal stresses of the process equipment.

What is claimed is:

1. In combination, a gas turbine, a vessel containing a stationary bed of solids, said solids having a heat capacity in the range of from about .1 to .3 B.t.u./lb./° F., having diameters less than 10 inches and being disposed as to allow gas flow through said vessel in the range of about 100 to 20,000 lb./hr./ft.$^2$, the ratio of the diameters of said solids to vessel diameter being less than about .1, and inlet means for passing the gases which are subject to sudden variations in temperature to said vessel, and conduit means for passing said gases having a reduced rate of temperature change to said turbine from said vessel.

2. The apparatus of claim 1 wherein said solids are spheres.

3. An apparatus comprising a gas inlet means, a catalytic oxidation zone, a heat storage zone having means to receive the hot oxidation gases which are subject to sudden variations in temperature from said catalytic oxidation zone, said heat storage zone comprising a bed of solids, said solids having a heat capacity in the range of from about .1 to .3 B.t.u./lb./° F., having diameters less than 10 inches and being disposed as to allow gas flow through said bed of solids in said heat storage zone in the range of from about 100 to 20,000 lb./hr./ft.$^2$, the ratio of the diameters of said solids to said vessel diameter being less than about .1, and a gas outlet means for withdrawing gases having a reduced rate of temperature change from said heat storage zone.

4. The apparatus of claim 3 wherein said solids are spheres.

5. In combination, a gas turbine and an apparatus comprising a gas inlet means, a catalytic oxidation zone, a heat storage zone having means to receive the hot oxidation gases which are subject to sudden variations in temperature from said catalytic oxidation zone, said heat storage zone comprising a bed of solids, said solids having a heat capacity in the range of from .1 to .3 B.t.u./lb./° F., having diameters less than 10 inches and being disposed as to allow gas flow through said bed of solids in said heat storage zone in the range of from about 100 to 20,000 lb./hr./ft.$^2$, the ratio of the diameters of said solids to said vessel diameter being less than about .1, a gas outlet means from said heat storage zone and conduit means for passing said hot oxidation gases having a reduced rate of temperature change into said turbine from said heat storage zone.

6. A process for protecting turbines from the effects of thermal variations, comprising passing gases through a heat storage apparatus comprising a vessel containing a bed of solids, said solids having a heat capacity in the range of from about .1 to .3 B.t.u./lb./° F., having diameters less than 10 inches and being disposed as to allow gas flow through said vessel in the range of about 100 to 20,000 lb./hr./ft.$^2$, the ratio of the diameters of said solids to vessel diameter being less than about .1, prior to passing said gases through said turbine.

7. A process for minimizing the temperature variation of inlet gases to a turbine wherein said gases contain catalytically combustible materials, comprising catalytically oxidizing said gases, and passing the hot oxidation gases through a heat storage apparatus comprising a vessel containing a bed of solids, said solids having a heat capacity in the range of from about .1 to .3 B.t.u./lb./° F., having diameters less than 10 inches and being disposed as to allow gas flow through said vessel in the range of about 100 to 20,000 lb./hr./ft.$^2$, the ratio of the diameters of said solids to vessel diameter being less than about .1, prior to passing said oxidation gases through said turbine.

8. In combination with a catalytic oxidation zone for heating a supply of relatively cool gas and a gas turbine for utilizing the so-heated supply of gas, a stationary bed of metallic, heat-accumulating spheres supportably retained in a chamber for passage therethrough of the heated gas emanating from said catalytic oxidation zone and the interchange of sensible heat from said heated gas to said spheres, and a by-pass line for diverting said supply of relatively cool gas from said catalytic oxidation zone through said chamber to said turbine to cause a reversal of the interchange of sensible heat, whereby upon such diversion a more gradual decline in the temperature of the gas entering said gas turbine is effected.

9. In combination with an oxidation zone for heating a supply of relatively cool gas and a temperature sensitive means for utilizing the so-heated supply of gas, a stationary bed of metallic, heat accumulating material supportably retained in a chamber for passage therethrough of a heated gas emanating from said oxidation zone and the interchange of sensible heat from said heated gas to said material, and a bypass line for diverting said supply of relatively cool gas from said oxidation zone through said chamber to said temperature sensitive means to cause a reversal of a interchange of sensible heat, whereby upon such diversion a more gradual decline in temperature of the gas entering said temperature sensitive means is effected.

10. In a process for maintaining a product gas between a predetermined high temperature and a predetermined low temperature so as to protect a temperature sensitive device, wherein a relatively cool gas is oxidized in an oxidation zone to produce a relatively hot effluent, the improvement which comprises:

passing said effluent through a heat accumulator prior to passage to said temperature sensitive device; withdrawing a product gas from said heat accumulator; detecting the temperature of said product gas; diverting said relatively cool gas from said oxidation zone and passing said relatively cool gas directly to said heat accumulator when said product gas temperature rises above said predetermined high temperature; and redirecting said relatively cool gas to said oxidation zone when said product gas temperature falls below said predetermined low temperature.

References Cited in the file of this patent

UNITED STATES PATENTS

| | | |
|---|---|---|
| 1,197,456 | Dinsmore | Sept. 5, 1916 |
| 1,550,185 | Steenstrup | Apr. 18, 1925 |
| 2,087,628 | Irwin | July 20, 1937 |
| 2,446,388 | Ramseyer et al. | Aug. 3, 1948 |
| 2,624,172 | Houdry | Jan. 6, 1953 |
| 2,891,774 | Theoclitus | June 23, 1959 |

FOREIGN PATENTS

| | | |
|---|---|---|
| 702,049 | Germany | Jan. 29, 1941 |
| 154,254 | Great Britain | Nov. 22, 1920 |
| 386,754 | Great Britain | Jan. 26, 1933 |
| 690,759 | Great Britain | Apr. 29, 1953 |